United States Patent [19]

Palmaer et al.

[11] Patent Number: 5,181,601
[45] Date of Patent: Jan. 26, 1993

[54] PLASTIC CONVEYOR BELT WITH INTEGRAL SIDEPLATE

[76] Inventors: Karl V. Palmaer, 108 Winding Canyon La., Folsom, Calif. 95630; Eric K. Palmaer, 1641 Klamath River Dr., Rancho Cordova, Calif. 95670

[21] Appl. No.: 594,623

[22] Filed: Oct. 9, 1990

[51] Int. Cl.⁵ .............................................. B65G 15/02
[52] U.S. Cl. ...................................... 198/831; 198/852
[58] Field of Search ............... 198/850, 851, 852, 853, 198/831

[56] References Cited

U.S. PATENT DOCUMENTS

| | | | |
|---|---|---|---|
| 3,870,141 | 3/1975 | Lapeyre et al. | 198/853 |
| 4,080,842 | 3/1978 | Lapeyre et al. | 198/853 X |
| 4,213,527 | 7/1980 | Lapeyre et al. | 198/853 |
| 4,222,483 | 9/1980 | Wootton et al. | 198/831 |
| 4,742,907 | 5/1988 | Palmer | 198/831 |
| 4,765,454 | 8/1988 | Hodlewsky et al. | 198/853 X |
| 4,821,872 | 4/1989 | Lapeyre | 198/853 |
| 4,865,183 | 9/1989 | Hodlewsky et al. | 198/853 X |
| 4,901,844 | 2/1990 | Palmaer et al. | 198/852 X |
| 4,934,517 | 6/1990 | Lapeyre | 198/852 |
| 4,934,518 | 6/1990 | Lapeyre | 198/853 |
| 4,941,568 | 7/1990 | Lapeyre | 198/853 |
| 4,949,838 | 8/1990 | Lapeyre et al. | 198/853 |
| 4,993,544 | 2/1991 | Bailey et al. | 198/853 X |

FOREIGN PATENT DOCUMENTS 2344975 3/1975 Fed. Rep. of Germany ...... 198/853

Primary Examiner—Robert P. Olszewski
Assistant Examiner—Cheryl L. Gastineau
Attorney, Agent, or Firm—Thomas M. Freiburger

[57] ABSTRACT

A plastic conveyor belt formed of a large number of plastic belt modules includes outer belt modules having integral sideplatges. The sideplates are of heavier material and higher strength, for withstanding stress around the outside of curves and for withstanding edge wear in certain types of conveyor systems. In a preferred embodiment, each sideplate has a depending guide member which may include a hold down tab. In one embodiment, plastic connecting rods which serially connect belt modules are discontinuous in length, made up of several coaxial pieces which are held in place by press fitting at the outer ends. This enables the rod to be of high shear strength in areas of high pulling force, e.g. at the outside of a radius conveyor belt in a curve, but of lower strength extruded construction elsewhere.

20 Claims, 3 Drawing Sheets

PLASTIC CONVEYOR BELT WITH INTEGRAL SIDEPLATE

BACKGROUND OF THE INVENTION

The invention relates to conveyor belts. More specifically, the invention is concerned with a plastic conveyor belt formed of interdigited modules serially connected by transverse connecting rods.

Plastic conveyor belts, made up of a series of interconnected modules, are well known. Often used in food handling and processing, the belts are frequently made of a temperature resistant and easily cleanable plastic. The modular construction, which often includes two or more modular sections side by side to make up the width of a belt, enables versatility in easily achieving many different belt configurations, lengths and widths. Some of the modular plastic conveyor belts are designed for a straight conveying surface only, with the return of the belt being underneath the active load bearing surface.

Other modularly constructed belts are designed for radius conveyor belt use. Use as a radius type conveyor belt involves considerations not present in a straightflight belt. The belt must be guided around curves, and, as disclosed in U.S. Pat. No. 4,742,907, it is important that the belt modules not be guided around the curve by contact with surfaces at the inside of the curve. Such contact causes bunching and irregular travel of the belt at the inside of the curve. As discussed in the above mentioned patent, it is important to guide the conveyor belt around the outside of the curve for smooth travel, allowing the modules at the inside of the curve to collapse together.

A further consideration in radius type plastic conveyor belts is the high tension which is introduced into the belt on the outside of a curve. In U.S. Pat. No. 4,742,907 referenced above, outer sideplates are shown for insuring that the increased tension load can be handled at the outside of the curve in the belt.

The sideplates typically were attached at the ends of connecting rods used to interconnect plastic modules, with the rods extending continuously through the width of the belt. While effective for their intended purpose, these separate sideplates tended to place high shear loads on the typically plastic connecting rods while traversing the outside of a curve. They created a shear force acting on the rod, between the separate sideplate and the outside module. In addition, they required additional costs in parts and assembly time.

The plastic conveyor belt constructions described above typically had the connecting rods retained in place by "buttoning" or "rod heading" the ends of the rods after they were assembled in place. Thus, the plastic connecting rod, continuous throughout the width of the belt, was inserted transversely through the belt to interconnect the adjacent interdigited modules, then the ends of the rods were "buttoned" or "headed" by using a hot tool pushed against the rod end to partially melt and increase the size of the rod end. With both ends so treated, the rod was prevented from slipping out of the modules.

If sideplates were attached, as for a radius type belt, these would be inserted onto the ends of an adjacent pair of rods at the edge of the belt before buttoning the ends. The sideplates, such as shown in the above referenced patent, extended from one rod end to the next, so that a trailing end of one sideplate and a leading end of a successive sideplate would be present and overlapping at the end of each connecting rod. One end of each sideplate had a slotted hole for the connecting rod, to accommodate the shifting separation distance between successive belt modules as the belt entered the curve or exited a curve.

Because of the high shear loading on connecting rods at the outside of a curve, exacerbated by the separate sideplates, an expensive high-strength rod was required in most radius belts.

It is a principal purpose of the present invention to simplify modular plastic conveyor belt construction, particularly by eliminating the need for use of separate sideplates assembled onto the rods, by eliminating the need for "buttoning", and by an improved connecting rod construction. A related purpose is to eliminate shear acting between a separate sideplate and the outside module, present in prior constructions, by integrating the sideplate with projections of the outside module itself. These features make the belt and belt assembly more efficient in time and cost.

SUMMARY OF THE INVENTION

In accordance with the present invention, a modular plastic conveyor belt of the general type described above includes an integral sideplate, at least at one side of each of a series of belt modules. The integral sideplate comprises an integrally molded portion of the plastic belt module, generally thicker and heavier in plastic material than the normal interdigited projections of the plastic module. In effect, the integral sideplate comprises an offset pair of thicker, stronger, heavier projections which serve as interdigited projections along with the normal projections. The connecting rods pass through these heavier projections as well as the others.

The integral sideplate is of sufficient thickness and strength to take the place of the separate tension-member sideplates described above. Integral sideplates are included on belt modules at each position which will be at the outside of a curve in a radius conveyor belt. The integral sideplate carries tension loading at the outside of a curve of the plastic conveyor belt and saves considerable cost in the belt, both in assembly and in elimination of the cost of the separate sideplate. It also has longer rod bores, with greater bearing area against the rods.

Another important feature of the invention preferably included in the modular belt and belt assembly is the use of connecting rods which are discontinuous through their length, each being made up of two or more coaxial rod sections or segments. This enables side rod sections to be made separately and of relatively high shear strength material. They may be injection molded without requiring an injection molding of long dimension; and they replace long extensions, full belt width, which were required to be of high strength in many prior belt constructions. Where three or more rod sections are used to make up the length of a connecting rod, the rod sections at the side(s) of the belt intended to travel around the outsides of curves are formed of a high shear strength material (such as nylon) to withstand high stresses at the outsides of curves. The middle rod section may be a much less expensive, lower shear strength extrusion.

The rod sections at the ends of each connecting rod, i.e. the side edges of the belt, are press fit into place in fitted apertures of the belt module, thereby further reducing assembly costs by eliminating the need for buttoning or rod heading as described above. They are injection molded, allowing them to be formed with heads and with protrusions for press fitting, as seen further below.

Thus, in a typical belt assembly of the invention, designed as a radius belt for traversing curves either left or right, two high shear strength connecting rod sections are included in each connecting rod, one at each side of the belt. In belt assemblies of wide dimension, a further belt section of lower shear strength, preferably of extruded plastic material, may lie coaxially between the two outer high strength rod sections. The composite connecting rod is held in place via the press fit at both ends.

The principles of the invention are applicable to unitary belt modules, wherein a single integral belt module member extends through the width of the belt, and also to wider belts wherein composite rows of belt modules made up of two, three, four or more side by side molded plastic modules are included. In the former case, which may involve, for example, a six inch nominal belt width, two injection molded connecting rod sections, each of the higher shear strength, may make up each composite connecting rod. In the case of several molded plastic belt modules making up the width of the assembled belt, typically three connecting rod sections may be included in each composite connecting rod. A lower shear strength, extruded connecting rod section may be used as a middle section, with the two injection molded, high shear strength press fit rod sections at the outside of the belt. In such an assembly the belt modules are held together through the width of the assembled belt by the interdigited projections, which prevent separation of the abutting ends of side by side modules. The breaks in the discontinuous composite connection rod should be located at staggered positions relative to the breaks between belt modules, for better strength and integrity of the belt assembly.

U.S. Pat. No. 4,901,844 disclosed recesses in ends of plastic belt modules for receiving rod heads, but no provision was made for press fitting the rods in the modules. Also, that patent showed thick plastic side plates, but they were separate members and intended for a purpose different from the present invention.

It is therefore among the objects of the invention to significantly improve modular plastic conveyor belt construction, particularly in radius type conveyor belts, by eliminating the need for separate sideplate tension members to accept the extra tension associated with travel around the outside of curves, and further by providing a belt module structure with discontinuous connecting rods, adding further efficiency in assembly and saving in cost for the modular conveyor belt assembly. These and other objects, advantages and features of the invention will be apparent from the following description of preferred embodiments, considered along with the accompanying drawings.

DESCRIPTION OF PREFERRED EMBODIMENTS

Figure 1:
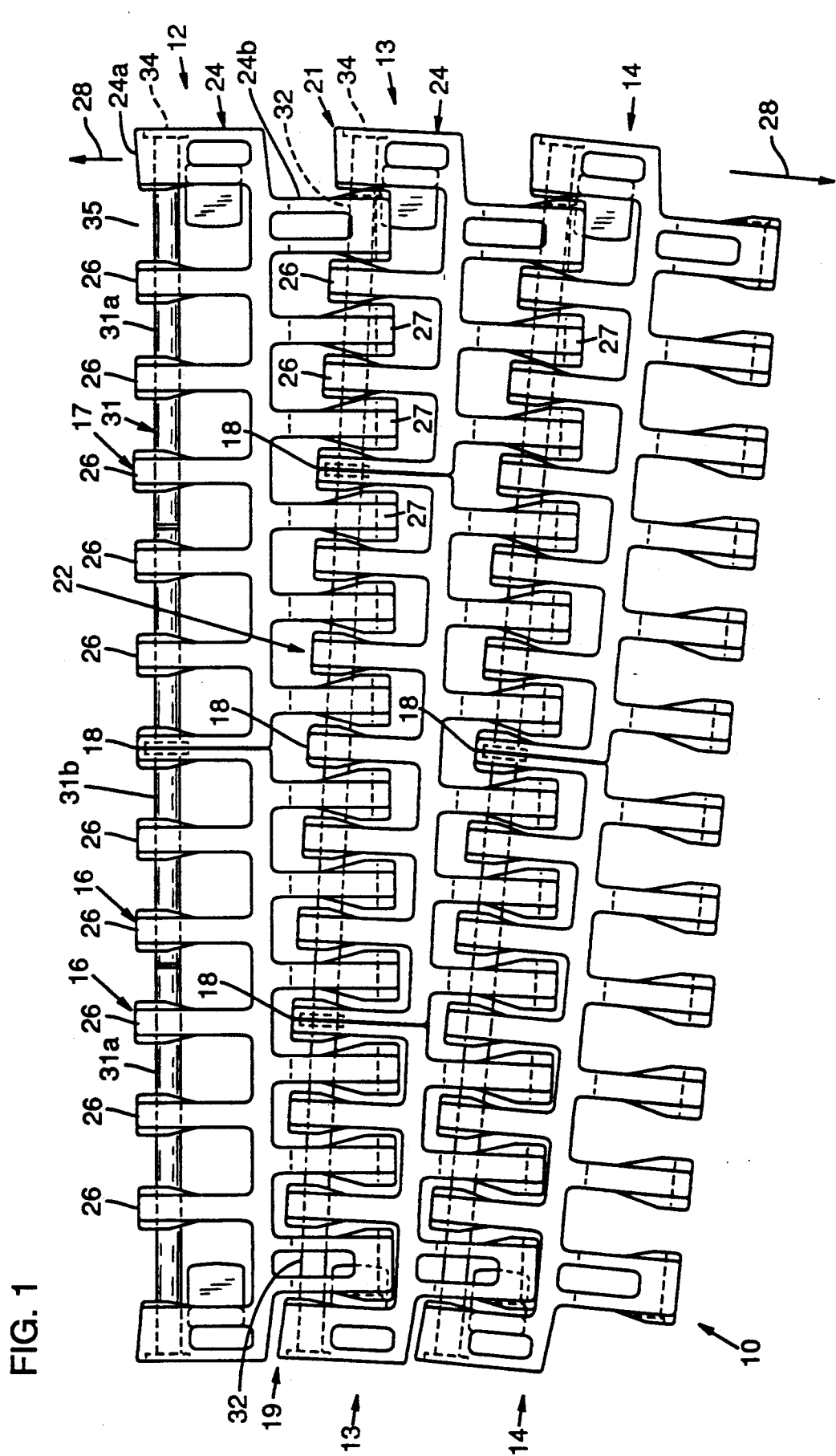
FIG. 1 is a plan view showing a portion of a modular plastic conveyor belt assembly in accordance with the principles of the invention.

In the drawings, FIG. 1 shows a portion of a modular plastic conveyor belt assembly 10 constructed in accordance with the principles of the present invention, and FIGS. 2 through 7 show features of belt modules which can be used to make up belts in accordance with the invention.

In the conveyor belt 10 illustrated in FIG. 1, a series of serially interconnected belt module rows 12, 13 and 14 are each formed of more than one individual belt module, arranged side by side. Each belt module row extends through the width of the assembled conveyor belt. Thus, the belt module row 12 in the embodiment illustrated is comprised of left and right belt modules 16 and 17, abutted together at a dividing line 18 as shown. The dividing lines 18 between serially interdigited, connected module members are staggered to assure the integrity of the assembled belt 10. Thus, the belt module row 13 is comprised of left and right belt modules 19 and 21, on either side of a central belt module row 22.

As discussed above, separate tension sideplate members are avoided according to the belt module construction of the invention. The function which was served by such separate sideplate members, which were secured at the ends of connecting rods as shown in U.S. Pat. No. 4,742,907, is more efficiently and better served by integral sideplates 24 in the belt module construction of the present invention. Each sideplate 24 is integrally molded with the plastic belt module of which it forms a part, such as the side module 17 of the belt module row 12 or the narrower side module 21 of the belt module row 13. The integral sideplates 24 are generally S-shaped or Z-shaped as shown, and of a considerably heavier, thicker plastic construction than the normal module projections 26 which extend in a first direction or projections 27 which extend in the opposite direction, which are used to interdigit with serially adjacent modules in the known manner. The thickened portions 24a and 24b of the sideplate 24 actually serve as interdigited projections similar to the normal projections 26 and 27, as can be appreciated from FIG. 1.

The integral sideplates 24 are shown on the outside of a curve in a radius type conveyor belt, wherein tension forces are ordinarily at a maximum, and accompanying shear forces on connecting rods are correspondingly high. It can be seen from FIG. 1 that these tension forces (indicated generally by arrows 28) are resisted through a zigzag line including the series of integral sideplates 24 and the shear resistance of connecting rods such as the rods 31 and 32 indicated in FIG. 1.

Another important feature of the present invention, which can be independent of but which also can be cooperative with the integral sideplates 24, is a connecting rod construction wherein each composite connecting rod (31 or 32, for example) is formed of two or more coaxial, aligned sections or segments. Thus, the first connecting rod 31, which is the rod most visible in FIG. 1, may include three separate sections—end sections 31a and a center rod section 31b. This facilitates two important purposes of the invention: first, the rod ends 31a at the outer sides of the belt can be press fit into place in the outside belt module 17, via an orifice 34 and rod end construction discussed further below. The integrity of the composite connecting rod 31 and of the full-width belt module member 12 is assured by the fixing of the rod sections into the belt modules only at the extreme side edges of the belt modules in each row. Secondly, the division of each connecting rod into separate segments enables the side or outer rod segments or sections 31a (at least at the side designed to be on the outside of a curve) to be of a higher shear strength plastic material, formed by injection molding so as to form the press fit structure. The middle section 31b can be of a relatively low cost extruded plastic fabrication, regardless of its length.

The high strength, injection molded sections or segments 31a can thereby be limited in length; in one embodiment of the invention involving 3-inch side modules the side rod segments are limited to about $3\frac{1}{2}$ to $3\frac{3}{4}$ inches, although other lengths can be used. The importance of the limited length of these injection molded rod sections is that in limited lengths, they can be produced at a reasonable cost. This is i contrast with a fullwidth connecting rod such as used in prior plastic conveyor belts, sometimes several feet in length, or even longer for extremely wide conveyor belts.

As a minimum, the length of the side rod segments (such as the segment 31a) should be at least sufficient to pass through the thickened projection 24a of the sideplate, through the adjacent space 35 and slightly into the bore of the next adjacent regular projection 26. This avoids shear problems in this high tension outer area.

Further, the separate connecting rod segments or sections, with outside ends secured into the module edges by press fitting, saves considerably in parts and assembly costs. The practice of buttoning or rod heading of the rod ends (described above) is avoided, as is the accompanying sometimes-used practice of including a stainless steel washer where buttoning was used or between the plastic module and the separate sideplate.

It should be understood that although the segmented connecting rod construction and the integral sideplates discussed above are cooperative together in achieving the strength, simplicity and cost efficiency which are goals of the present invention, it is possible to employ one feature without the other still embodying the principles of the invention. For example, the integral sideplate construction shown in FIG. 1 could be used with conventional, integral-length connecting rods, buttoned or rod headed at each end. On the other hand, the segmented rod construction could be used in a plastic belt construction which does not include the integral sideplate 24, such as in a straight-running belt.

Figure 2:
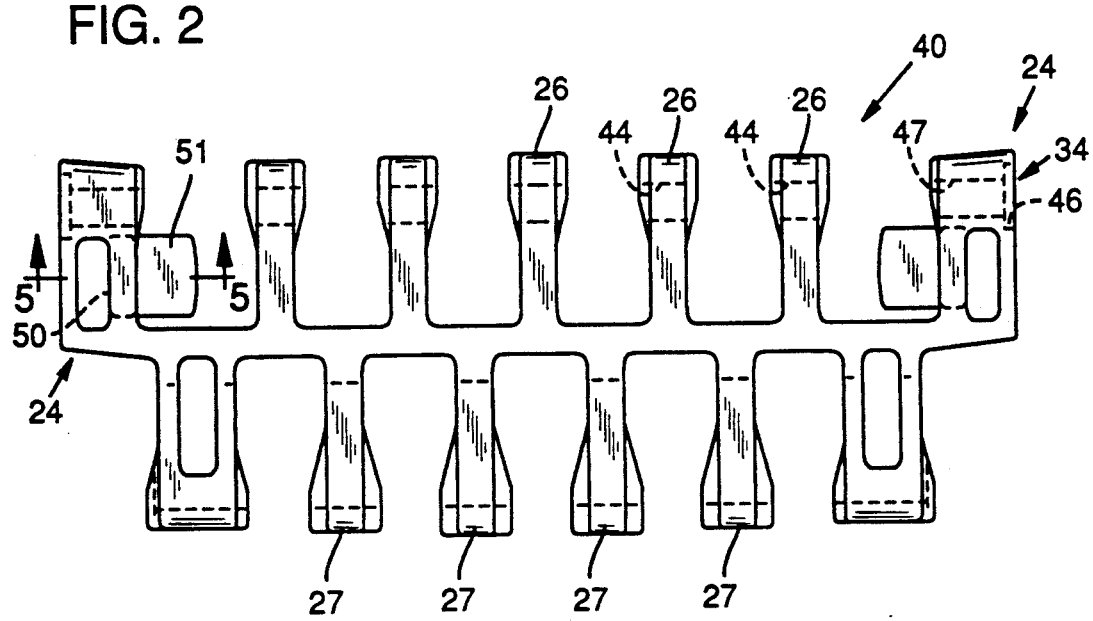
FIG. 2 is a plan view showing a belt module according to the invention, formed to be integral through the width of a relatively narrow belt.

FIG. 2 shows an example of a plastic conveyor belt module member comprising an integral component, for a relatively small belt width such as six or seven inches. As indicated, the full-width module 40 may include integral sideplates 24 at both sides. A belt assembled from modules 40 can thus be used as a radius belt with left or right curves, or both. A full width belt module such as the module 40 can alternatively be formed with the integral sideplate 24 at only one side, if desired, for use in a belt designed to travel around curves in only one direction.

Figure 7:
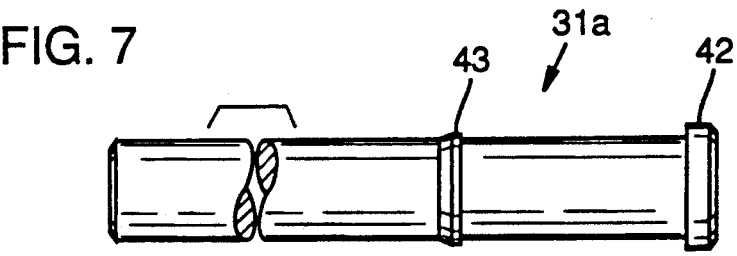
FIG. 7 is an elevation or plan view, partially broken, showing a connecting rod section which forms a part of the present invention.

FIG. 2 also shows in greater detail the press fit aperture 34 for receiving a connecting rod. A preferred construction of a side connecting rod with press fit structure, for use with the press fit aperture 34, is shown in FIG. 7. The connecting rod segment of FIG. 7, which may be the segment 31a shown in FIG. 1, has an integral end head 42 and an integral collar 43 spaced from the end head. As can be seen from FIGS. 2 and 7, the high strength connecting rod section 31a is pushed into the end orifice 34 of the plastic belt module 40, and through successive openings 44 in the regular projections 26. Ultimately the head end 42 will seat in an enlarged head cavity 46 of the integral sideplate structure 24. This fit could be an interference or press fit if desired, but it preferably is a loose fit. The press fitting engagement and gripping between the pin section 31a and the aperture 34 preferably is between the integral collar 43 and the smaller-diameter region 47 of the aperture. The distance from the head end 42 to the integral collar 43 is less than the total depth of the aperture 34, so that the interference collar or press fit collar 43 engages tightly against the inner wall of the bore 47, without reaching the opposite open end of the bore 47. In this way, a positive press fit engagement is achieved, one which can be released only by a deliberate and considerable force.

It should be understood that the rod head 42 need not be recessed into the edge of the module, although this is preferred for side clearance and for certain types of belt service. Also, the integral collar 43 could be replaced with other interference-fit structures, such as outwardly protruding splines or nipples, and a further diameter differential can be included in the aperture 34 if desired, to help lock such nipples in place.

Figure 3:
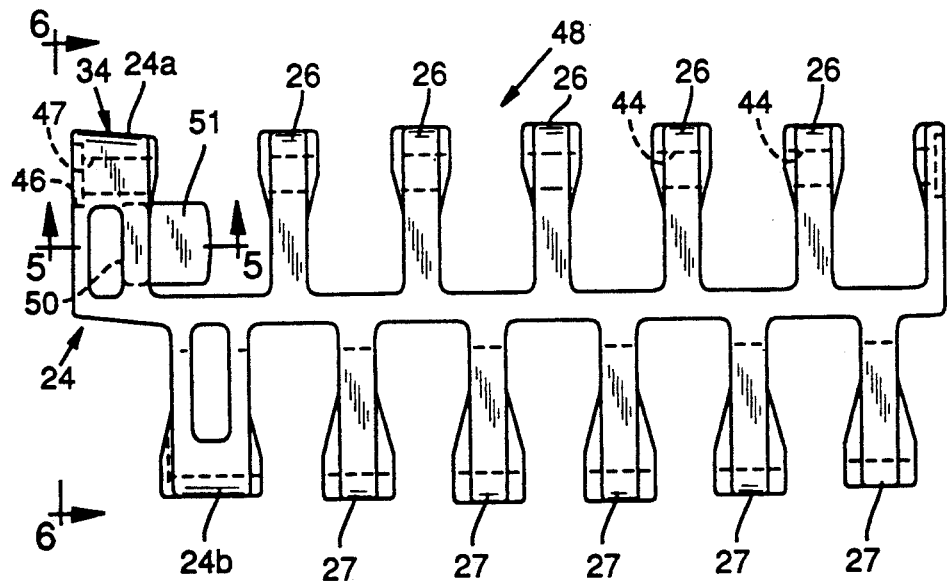
FIG. 3 is a view similar to FIG. 2, but showing a belt module configured to be assembled along with other modules to make up the width of the conveyor belt.
Figure 4:
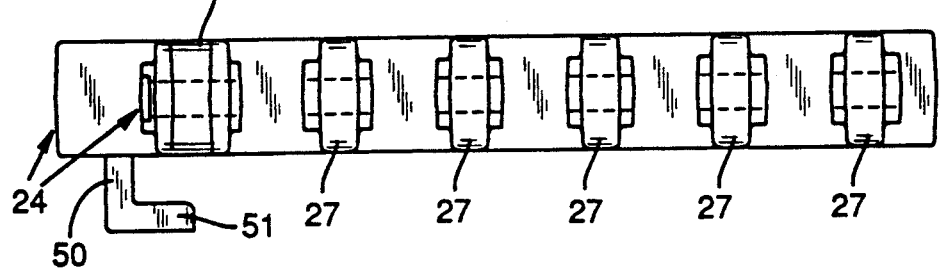
FIG. 4 is an elevation view showing the belt module construction of FIG. 3, as seen looking in the direction of movement of a conveyor belt which would include the module.

FIG. 4 is an elevation view showing the ends of the integral sideplate 24 and of the regular projections 27. As can be seen from FIGS. 1, 2, 3 and 4 collectively, the integral sideplate in the belt construction of the invention actually acts as one of the projections, 26 or 27. Thus, each integral sideplate 24 has a thickened portion 24a extending in a first direction, and a thickened portion 24b extending in the second or opposite direction. These act as thicker versions of the first set of projections 26 or the second set of projections 27, respectively.

FIG. 4 is a view of the belt module 48 shown in FIG. 3, which is a "left hand" module (i.e. having the integral sideplate 24 only at the left side). FIG. 2, on the other hand, shows the module 40 having integral sideplates 24 on both ends, which is the case for a single module which extends through the width of a relatively narrow belt. The module 48 of FIG. 3 and 4 can be used alone, if desired, for a conveyor belt which travels around left curves but not right curves.

Figure 5:
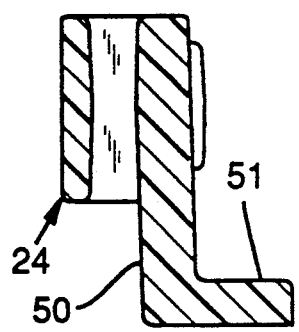
FIG. 5 is a sectional elevation view as seen generally along the line 5—5 in FIG. 3.
Figure 6:
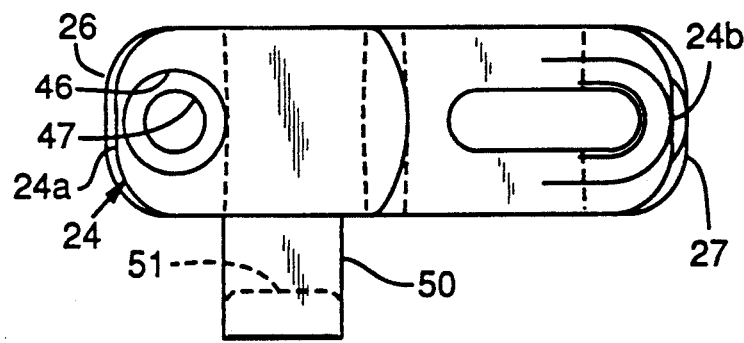
FIG. 6 is an end view showing the outer end of a belt module constructed in accordance with the invention, as seen generally along the line 6—6 in FIG. 3.

As seen in FIGS. 2, 3 and 5, the belt modules of the invention preferably include an integral guide member 50 which functions to assist the belt in being guided only around the outside of a curve. This function is explained in the above referenced U.S. Pat. No. 4,742,907. The guide member 50 is positioned to engage against wearstrip structure on a stationary portion of the conveyor belt system, just below the active loadcarrying flight of the belt. As also seen in FIGS. 2, 3, 5 and 6, the guide member 50 preferably has a hold down tab 51 extending horizontally, i.e. parallel to the plane of the conveyor belt. The principle of the hold down tab member 51 is also disclosed in U.S. Pat. No. 4,742,907, serving to keep a curving belt flight from pulling up under tension forces.

It should be understood that although the drawings show preferred embodiments of belt modules, belt module rows and assembled conveyor belts wherein one, two or three plastic modules make up each elongated belt module row, the invention encompasses assemblies wherein any number of individual components can make up a belt module row. So long as side modules for use at the side of a conveyor belt include at least a pair of regular projections in addition to the heavier first and second projections forming the integral sideplate, other the belt module row can include further belt modules even down to individual pairs of projections, i.e. links having only a first projection and a second projection formed integrally. Thus, the principles of the invention are applicable to a range of types of belt module row construction, from unitary elongated integral belt modules (extending through the width of the belt) to a multiplicity of individual links, with the side members including multiple projections with the integral sideplate.

Further, although the preferred embodiments are illustrated and discussed above relative to advantageous use in conveyor belts adapted to travel around curves, the integral sideplate modules and also the discontinuous, press fitted connecting rods, can be advantageously used in belts having only straight sections. These features can be part of a plastic modular system having universality of use for different types of belts, and, particularly in the case of the integral sideplates, they can be important in uniformity of belts, for example where a straight belt feeds a belt which includes curves.

The above described preferred embodiment is intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. In a plastic conveyor belt capable of following a path including straight and curving section and including a series of connected and serially interdigitated elongated molded plastic belt module rows each including one or more belt modules in the row, the belt module rows being connected by rods extending transversely to the length of the conveyor belt, each belt module row having a set of first aligned spaced projections extending in one direction from the row and a set of second aligned spaced projections extending an opposite direction and arranged generally in staggered relationship with the first projections, the first and second projections of serially adjacent module rows being longitudinally overlapping and juxtaposed when the modules are connected serially in the conveyor belt by the connecting rods extending through transverse openings in the projections, the transverse openings of one of said sets of spaced projections being longitudinally elongated slotted holes to accommodate lateral curves wherein the module rows become angularly shifted and collapse together at the inside of the curve, with substantially the entire longitudinal tension of the belt from module to module carried at the outside of a curve, the improvement comprising, at one side of each of a series of belt modules which include first and second spaced projections, an integral sideplate in a position to be at a side edge of the conveyor belt, the sideplate being integrally molded with the remainder of the plastic belt module and being generally thicker and heavier in plastic material, and stronger in longitudinal tension, throughout its length, than the first and second spaced projections, the integral sideplate including a first sideplate projection and a second sideplate projection laterally offset from each other and generally in positions corresponding to those of said first spaced projections and second spaced projections of the row, respectively, such that the first sideplate projection will extend to the extreme outer side edge of the assembled conveyor belt and the second sideplate projection will be inwardly offset from the first, in position to be engaged between a first sideplate projection and one of said first spaced projections of a serially adjacent belt module in the assembled conveyor belt, and the first and second sideplate projections having transverse openings aligned with those of the first and second spaced projections, to receive a connecting rod, the heavier plastic material of the integral sideplate serving to enhance the strength of the belt in longitudinal tension at the outside of a curve and not serving to resist to any appreciable degree any connecting rod elongation forces which may be present, which would act in a lateral direction in the modules, whereby the need for a separate, non-integral sideplate is avoided, with the interconnected modules and the conveyor belt given strength by the integral sideplates, receiving essentially all of the belt's tension at the outside of a curve.

2. The apparatus of claim 1, wherein the integral sideplate has a depending guide member integrally formed with the sideplate and extending downwardly from the nonload bearing surface of the belt module in a position to laterally engage a stationary surface below the conveyor belt, in position to guide the belt around the outside of a curve by retaining the belt from pulling inwardly around the curve.

3. The apparatus of claim 2, wherein each guide member further includes a hold down tab member comprising a flange extending from the guide member in a plane generally parallel to the conveyor belt, and including a wear strip with hold down support structure adjacent to said stationary surface and positioned to be contacted by the hold down tab members upon upward movement of the guide member and hold down tab member in travel around the outside of a curve in the belt's path.

4. The apparatus of claim 1, wherein the conveyor belt includes a plurality of side by side belt modules making up each elongated belt module row to form the width of the belt, with a series of the elongated belt module rows connected serially by the connecting rods to form the length of the belt, and wherein the connecting rods are each discontinuous and formed of a plurality of aligned sections, with a side connecting rod section at said one side of the belt being of a higher shear strength than another rod section adjacent to and axially aligned with the side connecting rod section, and including means for preventing axial separation of the discontinuous connecting rods.

5. The apparatus of claim 4, wherein said side connecting rod section at one side of the belt comprises an injection molded connecting rod section.

6. The apparatus of claim 4, wherein the plurality of side by side belt modules have division lines between them in the elongated belt module row, and wherein the connecting rods are discontinuous at locations staggered from said division lines.

7. The apparatus of claim 4, wherein said side connecting rod section at one side of the belt has a length at least sufficient t extend through said first sideplate projection and through one second sideplate projection of a serially adjacent module and into one of said first spaced projections.

8. The apparatus of claim 4, wherein each connecting rod includes said side connecting rod sections of higher shear strength at each side of the belt, and a central section of lower shear strength.

9. The apparatus of claim 4, wherein the means for preventing axial separation of the connecting rods includes the connecting rod sections at each side of the belt, including said side connecting rod sections of higher shear strength, each having an enlarged press fit means at an end positioned to be at the outside of the belt, and the integral side plate at said one side of the belt module having press fit bore means for receiving the enlarged press fit means of the connecting rod section in a forced, press fit, so as to retain the connecting rod section in place in the module.

10. The apparatus of claim 8, wherein the side connecting rod sections are injection molded rod sections, and wherein the central connecting rod section is an extruded rod section.

11. The apparatus of claim 1, wherein the connecting rods are each discontinuous and formed of a plurality of aligned, unconnected and generally abutted sections, and including means for preventing axial separation of the discontinuous connecting rods.

12. The apparatus of claim 11, wherein the plurality of aligned sections of each connecting rod include a side connecting rod section at said one side of the belt of a high shear strength, connecting the integral sideplates of serially adjacent modules so as to accept high tension and shear stress at the outside of a curve of the conveyor belt.

13. The apparatus of claim 11, wherein the means for preventing the axial separation of the discontinuous connecting rods comprises the connecting rod sections at each side of the belt each having an enlarged press fit means at an end positioned to be at the outside of the belt, and the integral sideplate at least at said one side of the belt module having press fit bore means for receiving the enlarged press fit means of the connecting rod section in a forces, press fit, so as to retain the connecting rod section in place in the module.

14. In a plastic conveyor belt capable of following a path including straight and curving sections and including a series of connected and serially interdigitated elongated molded plastic belt module rows each including one or more belt modules in the rows, the belt module rows being connected by rods extending transversely to the length of the conveyor belt, each belt module row having a plurality of first spaced regular projections extending in one direction from the module and a plurality of second spaced regular projections extending an opposite direction and arranged generally in staggered relationship with the first projections, the first and second projections of serially adjacent module rows being longitudinally overlapping and juxtaposed when the modules are connected serially in the conveyor belt by the connecting rods extending through transverse openings in the projections, the transverse openings of one of said sets of spaced projections being longitudinally elongated slotted holes to accommodate lateral curves wherein the module rows become angularly shifted and collapse together at the inside of the curve, with substantially the entire tension of the belt from module to module carried in outer ones of said first and second projections at the outside of a curve as connected by the rods, the improvement comprising, a heavier first projection and a heavier second projection integral with belt modules also having first and second regular projections, at one side of each of a series of belt module rows, in a position to be generally at a side edge of the conveyor belt, the heavier first and second projections being offset in staggered relationship in the manner of the regular first and second projections, the heavier first and second projections being heavier throughout their combined length and stronger in longitudinal tension such that the heavier first and second projections add tensile strength to the belt module at said one side for resisting high tension forces around a curve in the conveyor belt, the heavier first and second projections together receiving essentially all of the belt's tension at the outside of a curve and acting as an integral sideplate for the belt module, not serving to resist to any appreciable degree any connecting rod elongation forces which, if present, would act in a lateral direction in the modules.

15. The apparatus of claim 14, wherein the conveyor belt includes a plurality of side by side belt modules making up each said elongated belt module row forming the width of the belt, with a series of the elongated belt module rows connected serially by the connecting rods to form the length of the belt, and wherein the connecting rods are each discontinuous and formed of a plurality of aligned connecting rod sections, with a side connecting rod section at said one side of the belt, wherein the heavier projections are located, being of a higher shear strength than another rod section adjacent to and axially aligned with the side connecting rod section, and including means for preventing axial separation of the discontinuous connecting rods.

16. The apparatus of claim 15, wherein the means for preventing axial separation of the connecting rods comprises the connecting rod sections at each side of the belt, including said side connecting rod sections of higher shear strength, each having an enlarged pres fit means at an end positioned to be at the outside of the belt, and the projection at each extreme side of the belt module row, at each end of the connecting rod, having press fit bore means for receiving the enlarged press fit means of the connecting rod section in a press fit, so as to retain the connecting rod sections in place in the module.

17. In a plastic conveyor belt adapted to follow a path including curving sections and including a series of connected and serially interdigitated molded plastic belt modules connected by rods extending transversely to the length of the conveyor belt, each belt module having a plurality of first spaced projections extending in one direction from the module and a plurality of second spaced projections extending an opposite direction and arranged generally in staggered relationship with the first projections, the first and second projections of serially adjacent modules being longitudinally overlapping and juxtaposed when the modules are connected serially in the conveyor belt by the connecting rods extending through transverse openings in the projections, the improvement comprising, each connecting rod being discontinuous and formed of a plurality of aligned, unconnected and generally abutting connecting rod sections, with a side connecting rod section at each side of the belt, and rod retaining means at the outer end of each side connecting rod section, for securing the side connecting rod sections to the modules and preventing axial separation of the discontinuous connecting rods.

18. The apparatus of claim 17, wherein the rod retaining means comprises an enlarged press fit means at the outer end of each side connecting rod section, positioned to be at the outside of the belt, and press fit bore means in outermost projections of the belt modules, at the sides of the belt, for receiving the enlarged press fit means of the side connecting rod section in forced, press fit, so as to retain the connecting rod section in place in the module.

19. The apparatus of claim 17, wherein the conveyor belt includes a plurality of side by side belt modules making up an elongated row of belt modules forming the width of the belt, with a series of the elongated belt module rows connected serially by the connecting rods to form the length of the belt, and each connecting rod including at least three connecting rod sections, with at least one of the side connecting rod sections being of higher shear strength than another connecting rod section adjacent to and axially aligned with the side connecting rod section, whereby the high tension and shear forces acting on the rod on the outside of a curve at said one side of the module are resisted by the higher shear strength connecting rod section.

20. A plastic conveyor belt module for use in forming a plastic conveyor belt made up of a series of serially interconnected belt module rows each including one or more generally similar such modules, the belt module and the plastic conveyor belt being adapted to follow a path including curving sections, comprising, a plurality of first spaced regular projections extending in one direction from the module and a plurality of second spaced regular projections extending in an opposite direction and arranged generally in staggered relationship with the first projections, such that the modules can be assembled with the first and second projections of serially adjacent modules longitudinally overlapping and juxtaposed when the modules are connected serially in a conveyor belt by connecting rods extending through transverse openings in the projections, the transverse openings being slotted to accommodate a curving path, and a heavier first projection and a heavier second projection integral with the belt module at least at one side of the module, in a position to be generally at a side edge of an assembled conveyor belt, the heavier first and second projections being offset in staggered relationship in the manner of the regular first and second projections, such that the heavier first and second projections add tensile strength to the belt module at the one side, for resisting high tension forces around a curve in an assembled conveyor belt, the heavier first and second projections together acting as an integral sideplate for the belt module, receiving essentially all of the belt's tension at the outside of a curve and not serving to resist to any appreciable degree any connecting rod elongation forces which, if present, would act in a lateral direction in the modules.

* * * * *